United States Patent [19]

Riches

[11] Patent Number: 4,699,442
[45] Date of Patent: Oct. 13, 1987

[54] ELECTRICAL CONNECTION DEVICES

[75] Inventor: Arthur J. Riches, Herne Bay, England

[73] Assignee: Amphenol Corporation, Wallingford, Conn.

[21] Appl. No.: 912,488

[22] Filed: Sep. 26, 1986

[30] Foreign Application Priority Data

Sep. 27, 1985 [GB] United Kingdom ............... 8523901

[51] Int. Cl.⁴ ........................................... H01R 4/24
[52] U.S. Cl. ..................................... 439/412; 439/717
[58] Field of Search ................... 339/97 R, 97 P, 98, 339/99 R, 198 G, 198 H

[56] References Cited

U.S. PATENT DOCUMENTS

| | | | |
|---|---|---|---|
| 4,479,692 | 10/1984 | Greenwood et al. | 339/99 R |
| 4,618,203 | 10/1986 | Greenwood et al. | 339/99 R |
| 4,624,522 | 11/1986 | Greenwood et al. | 339/99 R |

FOREIGN PATENT DOCUMENTS

2083293 3/1982 United Kingdom .

Primary Examiner—Joseph H. McGlynn
Attorney, Agent, or Firm—Bacon & Thomas

[57] ABSTRACT

An electrical connection housing, especially for undercarpet cable systems, including a fixed member (50) which is to be secured to a flat surface and which has an outer side face for receiving a module member (220, 222, 224). The module member has an inner face which conforms to the outer side face of the fixed member (50) and engagement extensions (230) which extend under the outer side face of the fixed member (50) for retention between the fixed member and the flat surface. Recesses (232) are provided in the bottom of a shroud (200) to receive T-shaped extensions (230). The module member may include telephone outlets, data outlets or power spurs.

18 Claims, 13 Drawing Figures

ELECTRICAL CONNECTION DEVICES

BACKGROUND OF THE INVENTION

1. Field of the Invention

This invention relates to connection devices such as junction boxes and the like for use with flat cables for power distribution such as the type designed for undercarpet use.

2. Description of the Prior Art

A demand exists for a connection system which is simple and effective to use in situ and which is nevertheless adaptable to a variety of different circumstances.

British Patent Application No. 84 24281 discloses a connection device in the form of a pedestal on which can be mounted a standard socket outlet unit. The pedestal is formed by a base member across which the cable is laid, an upper clamping member secured to the base member, and an insulative separating plate. The separating plate is inserted between conductive elements of the cable, notably beneath the earthing screen and above the current-carrying conductors. Contact with the current-carrying conductors is made by means of respective insulation displacement contact (IDC) means on a base member, which are joined to respective screw terminals. The separating plate stops the IDC means penetrating too far. A further IDC means on the clamping member connects with the earthing screen. The socket outlet is connected up with short lengths of electric wire, familiar to the electrician.

Such a connection device is of great practicality but there are instances where it would be desirable to provide other sockets closely adjacent to the power socket, such as telephone or data outlets, or to enable connection of further power outlets by flat cable to an existing outlet.

SUMMARY OF THE INVENTION

According to this invention in one aspect there is provided an electrical connection housing, comprising a fixed member adapted to be secured to a flat surface and having an outer side face for receiving a module member, and a module member having an inner side face conforming to the outer side face of the fixed member, the module member also having protruding engagement means extending under the outer side face of the fixed member to be retainer between the fixed member and the flat surface when the fixed member is fastened to the surface, whereby the module member is located in position without being directly secured to the surface, the module member providing a housing for a selectable type of connector member. The module member preferably has an outer side face of the same shape as the outer side face of the fixed member.

In another aspect the invention provides an insulation displacement contact assembly comprising a threaded bolt having a head with rotatable formations thereon, a cup-shaped insulation displacement contact on the end of the bolt and having insulation displacement portions on its rim pointing away from the head, and means retaining the contact on the bolt.

In a further aspect the invention provides an electrical connection device for connection to a flat conductor strip, the device comprising a housing block and a contact assembly, the contact assembly including a plate, a bolt threaded through the plate, and a cup-shaped insulation displacement contact on the end of the bolt and having insulation displacement portions on its rim, and the housing block having a first slot for receiving a portion of flat cable, and a second slot spaced from and parallel to the first for receiving the plate of the contact assembly.

This invention thus provides a connection device including a power socket and other sockets closely adjacent thereto, such as a telephone outlet, a data outlet or an additional power outlet. This invention is particularly suitable for undercarpet systems.

DESCRIPTION OF THE PREFERRED EMBODIMENTS

Figure 2:
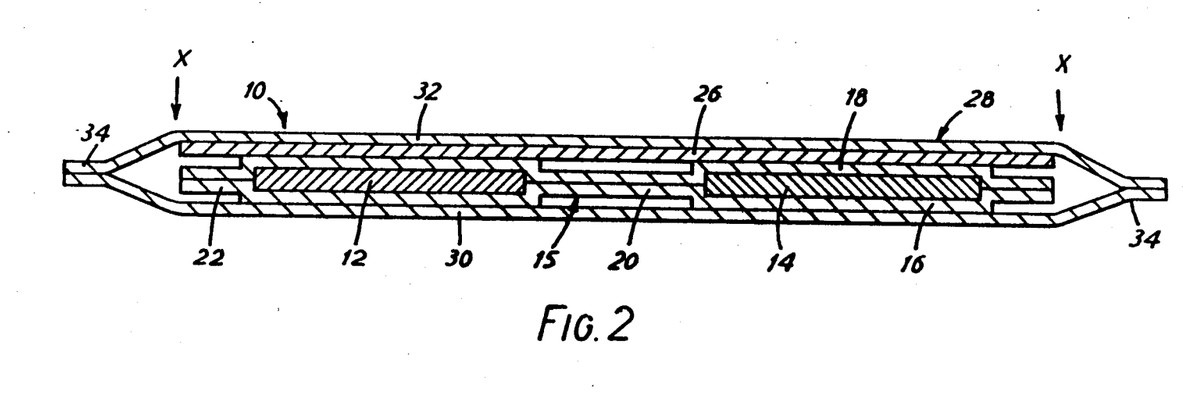
FIG. 2 is a section through the cable.

The undercarpet cable 10 shown in FIG. 2 will first be described. It has a live conductor 12 and a neutral conductor 14. For use on 240 volts with a 30 amp current rating, these conductors are preferably of copper strip about 0.25 mm thick and about 20 mm wide. These conductors 12,14 are sandwiched between two flat films or strips 16,18 which form an inner insulation sheath 15 and are about 60–65 mm wide. The strips 16,18 are each conveniently a lamination of a polyester layer of about 0.06 mm thickness on the outer side away from the conductors, a fire retardant vinyl layer also of about 0.1 mm, and a heat-sealable adhesive layer on the innermost side. The total thickness of each strip 16,18 is about 0.15 mm. The conductors 12,14 are placed side by side on the lower strip 16 with a space of the order of 10 mm between them, and the upper strip 18 is then applied. The composite is then passed through shaped heat-sealing rollers to cause the conductors to be fully bonded to the sheath, and the two layers of the sheath to be bonded to each other in the regions where there is no conductor. These regions comprise a central region 20 between the conductors, and edge regions 22 to either side of the conductors. The live and neutral conductors 12,14 are in this way formed into a sealed insulated inner package.

To form the complete cable a solid copper earthing (or grounding) conductor 26 is now placed over the conductor package. The earthing conductor has a width approximately equal to the width of the whole package and acts as an electromagnetic screen, as well as assisting effective heat dissipation and providing a safety function in the event that the cable is penetrated by a foreign body (e.g. a nail). The earthing conductor 26 can normally be about half the thickness of the live and neutral conductors 12,14. The earthing conductor 26 should preferably not be bonded to the package 24 but is simply loosely laid on it, and if it is bonded to the conductor package, it should be sufficiently lightly bonded to be readily separable from it by hand.

An outer insulation jacket or sheath 28 is now formed tightly around the combination of the package 24 and earthing conductor 26, by two flat strips 30,32 which are of the same plastics lamination as the strips 16,18, only about 20 mm wider. The edges 34 of the strips 30,32 are then heat sealingly bonded to each other to form a sealed sheath. Preferably also the earthing conductor 26 is bonded to the upper strip 32 and the package 24 can be lightly bonded, for example at intermittent bands along the cable, to the lower strip 30. The completed cable is then typically about 80–85 mm wide and 1 mm thick. The sheath 28 has the effect of sealing the edge portion of the cable construction, and attaching the edge of the earthing conductor 26 to the edge of the package 24 to hold them together.

The outer sheath 28 preferably carries indications, e.g. by colour coding, as to which is the top and which is the live conductor. If desired a second earthing conductor can be placed beneath the conductor package to provide further electrical and mechanical protection and also to enable the cable to be used either way up. This enables the cable to be made to change direction by a simple fold.

The dimensions given above are for a 240 volts 30 amp cable with twin and earth conductors. For three-phase applications an additional two current-carrying conductors can be incorporated and the overall size varied to give the required performance characteristics.

The cable is installed underneath the carpet in an office or like environment. The cable is laid on the floor and covered by a steel tape which provides mechanical protection and which is secured to the floor by adhesive tape. The carpet can then be replaced over the cable.

Figure 1:
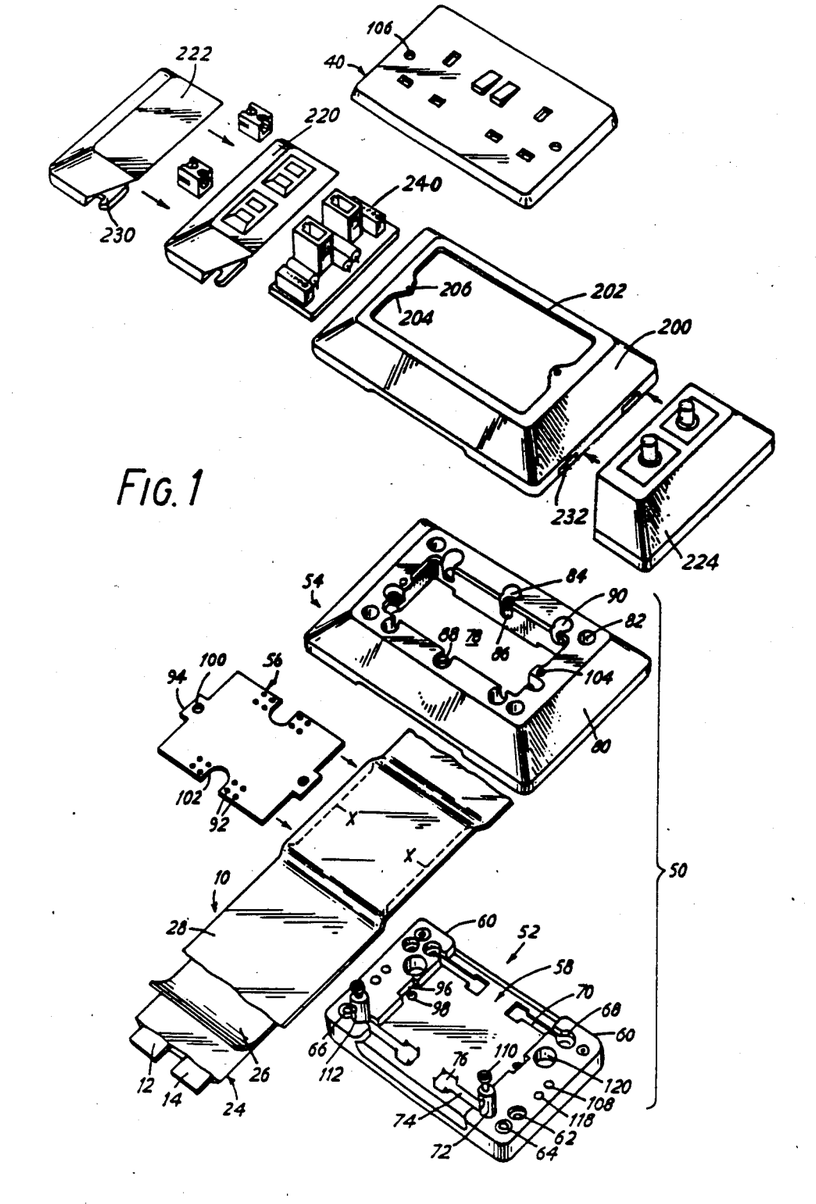
FIG. 1 is an exploded perspective view of an outlet socket and its pedestal mounted on an undercarpet power cable.

FIG. 1 illustrates the mounting of a socket outlet 40 on the cable 10. This is achieved by means of a box or pedestal 50 which is moulded of rigid plastics material and comprises a base unit 52, an upper clamp unit 54, and a shroud 200, together with an insulation plate 56. The socket outlet 40 is a standard socket outlet appropriate to the type of plug connector to be received, and in the United Kingdom can be a twin socket outlet in accordance with the relevant British Standard (BS 1363) as designed for flush or surface wall mounting. No special socket outlet unit is required. The socket outlet will normally have screw connectors designed to receive an input power cable of conventional type.

The base unit 52 is of generally rectangular shape and has a broad transverse recess 58 forming a surface across which the flat cable 10 is laid. The end pillars 60 to either side of this recess 58 contain various moulded bores. These include two bores 62 near two opposed corners of the base unit for receiving fixing screws, if the pedestal is to be mounted on a wooden floor, or masonary or concrete fixing devices for other floors. At the four corners of the base unit there are bores 64 which each accommodate a threaded bush 66 to receive a bolt (not shown) which secures the clamp unit 54 to the base unit.

Four bores 68 are also provided which open towards the transverse recess 58 and communicate with shallow channels 70 in the base of the recess. At least two of these bores, one on each pillar 60, receive screw terminals 72 which are connected by a copper strip 74 to an insulation-displacement contact (IDC) 76 to form a unitary contact member. The contact 76 comprises a square plate the corners of which are bent upwards as shown to provide four sharp contact points, capable of penetrating the insulating sheath of the cable 10 to make good electrical contact with the live and neutral conductors 12 and 14.

The clamp unit 54 is designed to fit over and around the base unit 52 and with the assistance of the plate 56 to press the package 24 in the cable 10 down onto the IDC contacts 76 so that proper contact is made. The clamp unit 54 is of the same general shape as the base unit but has a central aperture 78 for receiving the rear of the socket outlet 40 and associated wiring, and also a larger flange 80 which bears against the floor (or may be relieved to receive the edge of the carpet). Four bores 82 accommodate the bolts (not shown) which are received in the threaded bushes 66 in the base unit. When the bolts are tightened the necessary clamping force is applied to the cable. Preferably the bolts are of the type which take a hexagonal Allen key so that they can provide a large clamping force. Bores 84 adjacent the aperture 78 in the centre of the longer side of the clamp unit (the side which runs transverse to the cable) each accommodate a captive IDC terminal post 86. The lower end of the post 86 is designed to form an insulation displacement contact which provides an earth termination to the earth conductor 26 in the cable 10. The upper end of the post 86 is provided with a screw terminal 88 similar to the screw terminals 72 for the live and neutral conductors. Further bores 90 are aligned above the four possible positions of the terminal posts 72, and open into the aperture 78.

The manner in which the cable is connected to the pedestal will now be described.

The cable is laid across the floor and the desired position for an outlet socket is chosen. A hole of appropriate size is made in the carpet. At this point the electrician has to gain access to the cable conductors. This he does with a sharp knife by slitting or cutting off the edges 34 of the outer sheath 28 in the region that will be lying over the recess 58. The line of the cut is shown at X in FIG. 2 and by the dashed lines X in FIG. 1. With the cable described, making these cuts in the right place is very easy. It will be recalled that the earthing conductor 26 is at least as wide as the conductor package 24. Thus all the electrician has to do is to feel for the edge of the earthing conductor 26, and to cut alongside it. In this way he removes the edge portions 34 which bond the two halves of the outer sheath together, but he is in no danger of violating the live and neutral conductor package 24.

It will also be recalled that the earthing conductor 26 was not bonded to the conductor package 24 or at least not firmly bonded. Thus over the length where the edges 34 are removed, the cable can easily be separated into two parts with a gap between them. The top part consists of the top outer insulating strip 32 and the earthing conductor 26, and the bottom part consists of the bottom outer insulating strip 30 and the conductor package 24, the latter containing the live and neutral conductors 12 and 14 in the inner insulating sheath 15.

Now the electrician takes the insulating plate 56, which is of the same general shape as the recess 58 across which the cable lies. The electrician slides this plate between the two separated parts of the cable and places it over the recess 58. The clamp unit 54 is placed on top and the clamping bolts in bores 82 are tightened into bushes 66. The clamping force is sufficient to force the bottom part of the cable down onto the contacts 76 to cause the contact points to penetrate the insulation and make contact with the live and neutral conductors 12 and 14 respectively, and to cause the contact portion of the terminal post 86 to penetrate the earth conductor 26.

To assist in this the plate 56 has bores or recesses 92 which are aligned with the points of the contacts 76. To maintain the alignment of the plate 56, the plate has rectangular projections 94 at either end which slide into corresponding recesses 96 in the inside edges of the pillars 60. The base plate 52 may optionally include threaded bushes 98 at this point, in which case the plate 56 has corresponding holes 100. A bolt can then be passed through each hole 100 into the bush 98 and tightened to hold the plate 56 and hence the bottom part of the cable in place for the subsequent assembly stages.

The plate 56 is of such a thickness that there can be no danger of the contacts 76 penetrating from the underside as far as the top surface of the plate to make contact with the earth, or the earth IDC penetrating from the upper side to make contact with the live and neutral conductors below. To assist in allowing penetration of the conductor the plate has cut-outs 102.

The plate 56 can have appropriate instructions printed on it to assist the electrician in installing the socket outlet correctly.

To attach the standard socket outlet 40, the clamp unit 54 has two threaded bushes 104 at the required spacing at either end of the aperture 78. Conventional fixing bolts (not shown) pass through holes 106 in the socket outlet 40 and engage in bushes 104. The base unit 52 has two bores 108 which receive the ends of these fixing bolts should they protrude through the clamp unit 54. The shroud or cover 200 is interposed between the socket outlet 40 and the clamp unit 54. The shroud has a configuration generally similar to the top surface of the clamp unit 54, with a central aperture 202 just smaller than the outer periphery of the socket outlet so as to be clamped between the socket outlet and the clamp unit. Two lips 204 are provided having apertures 206 which are positioned in line with the bushes 104 in the clamp unit, so that the bolts in holes 106 pass through the apertures 206.

In use it is, of course, necessary to complete the electrical connections to the socket outlet 40 before it is bolted in place. The terminal posts 72 protrude through the bores 90 in the clamp unit 54, so that the screw terminals 110 are accessible from above and the wire-receiving transverse bores 112 in the terminal posts are open into the aperture 78. In the example illustrated in FIG. 1 there are two terminal posts 72, one for each of the live and neutral conductors 12 and 14, and this will be the usual arrangement. A short length of insulated wire is then run from the terminal posts to the terminals on the rear of the standard twin switched socket 40. The earth connection is provided by a further length of wire between the respective terminal on the socket 40 and the screw terminal 88 at the top of terminal post 86 which makes direct contact with the earth conductor 26 in the cable. This type of connection is familiar to electricians and so is easy to make and most unlikely to be made incorrectly. As the pedestal 50 provides a standard fixing for the socket 40, alternative types of outlet can be used which have the same fixing parameters.

An advantage of the system illustrated is that if it is desired to remove the socket outlet from the position in which it is installed, this can be done without difficulty. The only damage done to the cable is to make small pinpricks in the insulation.

The same basic pedestal can be used in other different configurations. Different types of outlet sockets can be mounted by using a spacer or adaptor moulding. The pedestal illustrated can also be used to join two lengths of cable 10, or as a transition box to join a length of conventional supply cable to the flat cable 10.

When used as a junction box to join two lengths of flat cable in line, the pedestal includes four of the terminal posts 72 and associated insulation displacement contacts 76 spaced in the recess 58. The cable lengths are cut so as to terminate in the middle of the recess, and thus the contacts 76 at one end of the recess 58 will embed in one of the cable ends and those at the other end of the recess in the other cable end. The live and neutral connections are completed by short lengths of wire between the terminal posts 72, and the earth connections by a short length of wire between terminal posts 86. A socket 40 can be mounted on such a junction box or, if no socket is required at that point, a conventional plain blanking plate can be used. This system is particularly useful in that it enables an existing cable length terminating at a socket outlet to be extended by an additional length of cable without the need to replace the existing length with a longer length.

The cable and pedestal cooperate to provide an extremely effective power distribution system for under-carpet use. The cable provides the current-carrying conductors with two layers of insulation, but is constructed so as to facilitate terminating and joining to the cable. The pedestal takes advantage of the cable construction and provides a simple but adaptable mounting which can be used in various configurations, namely with standard outlet sockets, or as a junction box to join two like cable lengths, or as a transition box to join the flat cable to a conventional cable, or to perform two of these functions simultaneously.

As thus far described, the system is essentially as described in British Patent Application No. 84 24281, though with the addition of the shroud 200. The shroud or cover gives the added advantage of being replaceable to enable other styles of socket to be fitted, as may be used in other countries, without having to change the base and clamp unit. It also allows colour changes to be made easily and hides any unacceptable marks on the clamp unit.

The construction of the earlier application has proved extremely practical, in enabling power to be made available in an area such as a shop or office at a position remote from the walls without the need to cause any significant disruption in installation. It has been appreciated that the system would be significantly enhanced if, in addition to mains power, other facilities could be made available such as telephone and/or data links. Flat cable suitable for running to such an island site is readily available; the voltages involved do not pose the same dangers to personnel as do mains voltages. Also it is sometimes desired to add further power outlets and the easiest way of doing this is often to provide a spur from an existing outlet.

Figures 3, 6:
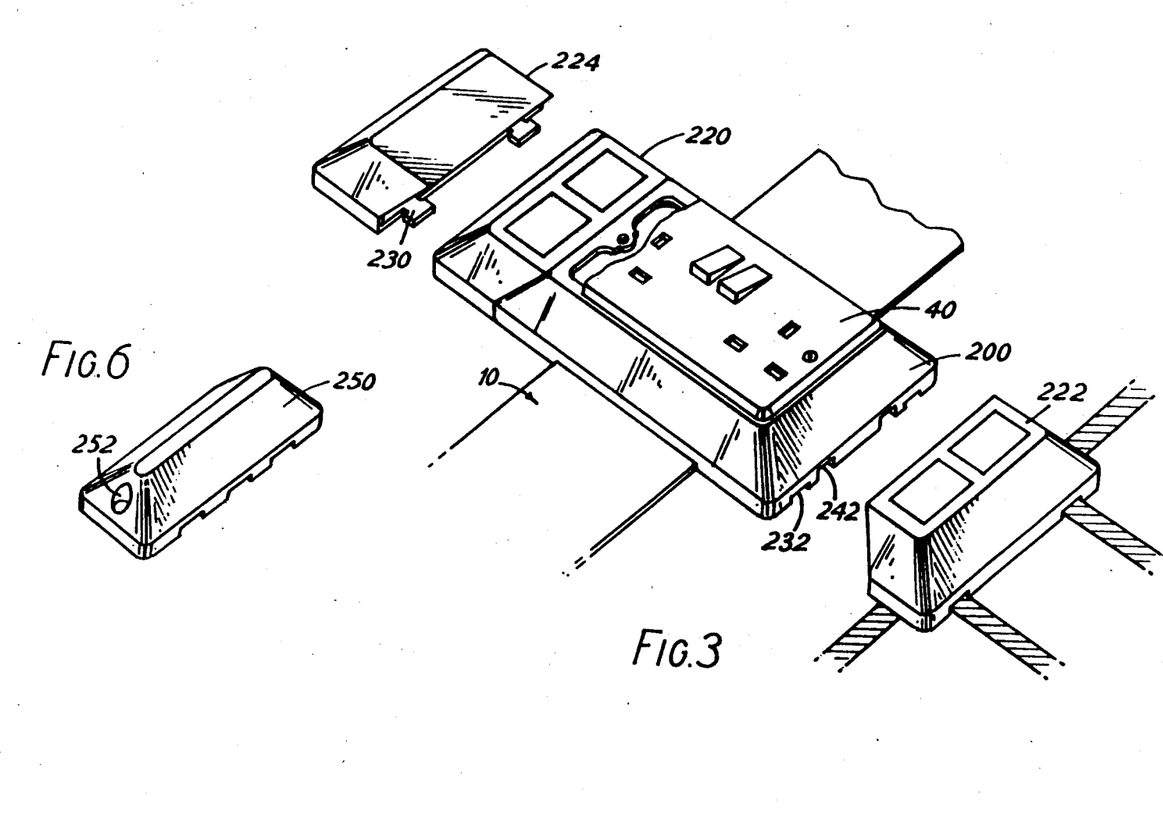
FIG. 3 is a perspective view of the pedestal when assembled with associated modules.
FIG. 6 is a perspective view of a link section for joining modules in the absence of a power outlet pedestal unit.

With various objects in mind the system of FIG. 1 includes various modules 220, 222, 224 which can be attached to the sides of the pedestal unit 50. Module 220 provides two telephone outlets, module 222 has two data outlet sockets, and module 224 is designed to enable a power spur to be connected. FIG. 3 shows the modules connected to the assembled central pedestal unit. The modules can be chained together except that no further modules may be added before or after a power spur module 224 because the outgoing power cable will be in the way and power cables from the spur connect directly to the power pedestal.

Figure 4:
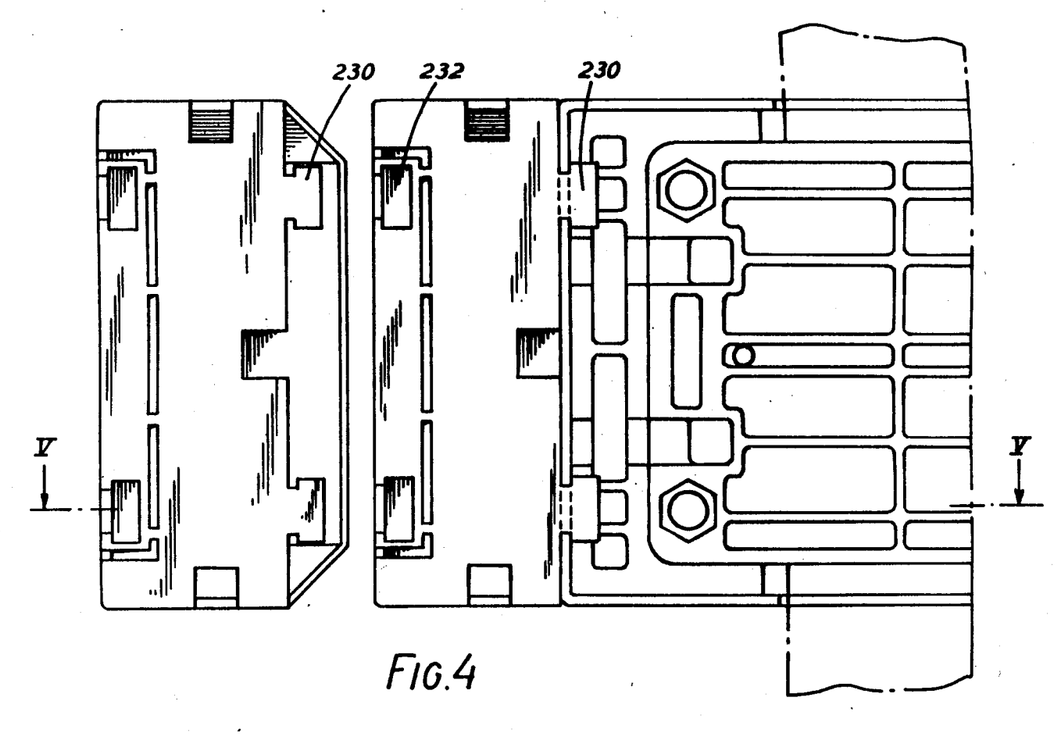
FIG. 4 is an underplan view of part of the pedestal unit and modules.
Figure 5:
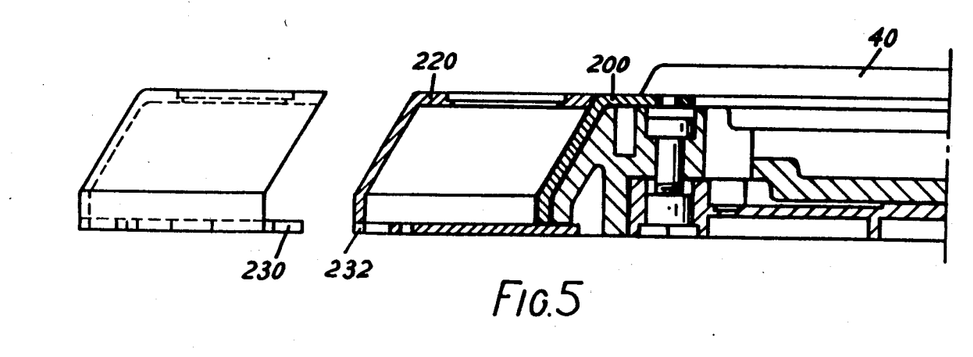
FIG. 5 is a sectional view taken on the line V—V in FIG. 4.

FIGS. 3 to 5 show how the modules are attached to the pedestal unit 50. The modules have the outline shape of the end part of the shroud 200, and their inner faces conform to the shape of the end part of the shroud, so as to provide a natural extension to the shroud. The outer face of the shroud is generally inclined downwardly and outwardly, as seen in FIGS. 3 and 5. The inner face of the module 220 has as an extension of its bottom surface two T-pieces 230. These T-pieces pass through recesses 232 in the bottom of the shroud and of the clamping unit, and stop the module from moving away from the pedestal or the preceding module, thus holding the structure in the assembled condition.

The method of assembly of the modules onto the pedestal is best illustrated by FIG. 5. The socket outlet 40 is first released, also releasing the shroud or cover 200. The modules are then abutted to the power pedestal and held captive by the cover when the cover is screwed into position. The module can not now be removed as the T-pieces can not be released from the cover unless the cover is lifted from the floor.

If it is desired to change the accessory modules, it is necessary only to release the cover 200. It is not necessary to unscrew the clamp unit or base and the IDC contacts remain undisturbed.

The underside of the modules is hollow to accommodate the connector components as shown at 240 in FIG. 1. If desired, recesses 242 (FIG. 3) can be provided to allow access between the module and pedestal interiors for conductor wires. The socket-receiving modules 220 and 222 have standard sized openings which receive telephone, data or fibre optic connectors as desired. FIG. 3 illustrates how the telephone and data lines to the modules can be laid under the carpet, either parallel or at right angles to the run of the power cable.

It may sometimes be desired to use the modules 220 or 222 separately from the power outlet pedestal unit. This can be done using the link member 250 of FIG. 6 which is configured like the two opposed ends of the shroud or cover 200. Two bores 252 are provided by which the link member can be secured to the floor with fastening devices.

Figure 7:
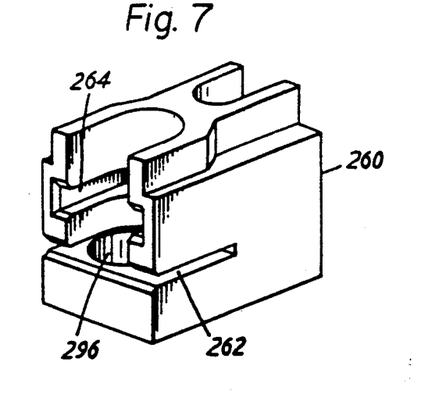
FIG. 7 is a perspective view of a plastics block for housing an insulation displacement contact (IDC) in the power module.
Figure 8A:
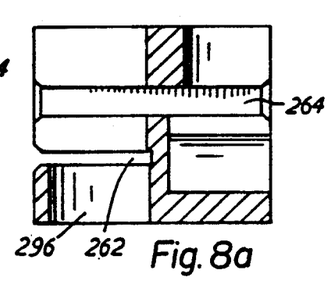
FIGS. 8a–8e shows various views of the block of FIG. 7, namely (a) a sectional view, and (b) front, (c) back, (d) top and (e) bottom views.
Figure 8B:
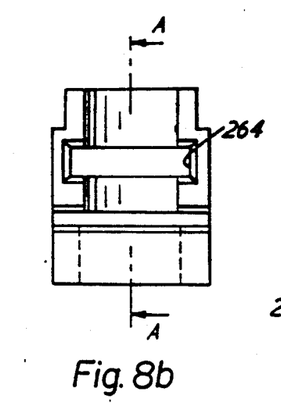
Figure 8C:
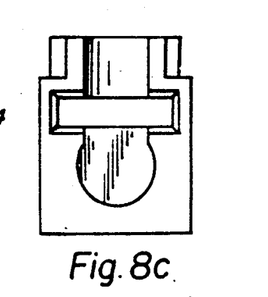
Figure 8D:
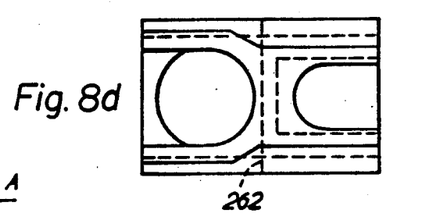
Figure 8E:
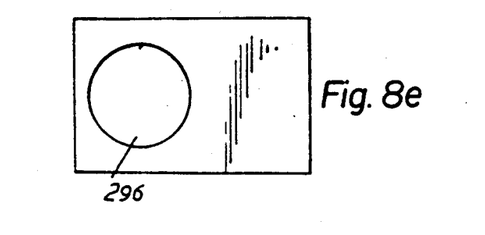
Figure 9:
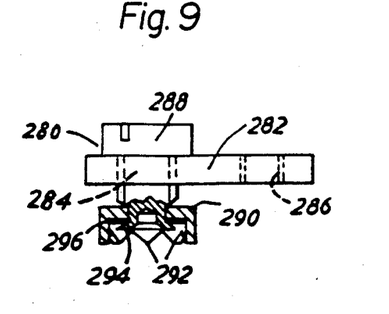
FIG. 9 is a side view of the IDC assembly used in the block.

The power spur module 224 is slightly different in that it has no socket outlet apertures and really just provides a cover for insulation displacement contacts used to connect a spur cable. These contact members are illustrated in FIGS. 7 to 9 and comprise a nylon moulding 260 (FIGS. 7 and 8) and a contact assembly 280 (FIG. 9). The moulding 260 is generally rectangular of about 20 mm by 16 mm by 13 mm and essentially provides two slots, a first open slot 262 for receiving the end of a flat conductor from a section or cable, and second through slot 264 for locating the contact assembly above the cable end.

The cable assembly 280 comprises a flat brass plate 282 having two threaded bores 284, 286. Into one of these there is threaded a bolt 288 having a slotted head and which carries at its end a cup-shaped IDC contact 290 having eight triangular teeth 292 formed on its rim and pointing away from the head of the bolt. The end of the bolt is rivetted over as at 294 to retain the contact 290 on the bolt while allowing relative rotation of the bolt and contact. A washer 296 may assist in this.

The assembly 290 is slid into the slot 264 in the moulding 260. This will position the contact 290 above the plane of the cable-receiving slot 262. A recess 296 may be provided beneath the contact 290. When a piece of cable is in the slot 262, the bolt 288 can be tightened with the aid of a screwdriver in the head of the bolt, moving the threaded bolt downwardly through the plate 282 and forcing the teeth 292 into the cable end. A positive connection is thus made. The other bore 286 in the strip 282 enables a normal screw connection to be made to a short length of cable, the other end of which is terminated on one of the terminal posts 72 and 86 as appropriate.

The contact system formed by bolt 288, cup-shaped IDC contact 290 and washer 296 may be suitable for other purposes and the terminal post 86 may be of similar design.

I claim:

1. An electrical connection housing, comprising a fixed member adapted to be secured to a flat surface and having an outer side face for receiving a module member, and a module member having an inner side face conforming to the other side face of the fixed member, the module member also having protruding engagement means extending under the outer side face of the fixed member to be retained between the fixed member and the flat surface when the fixed member is fastened to the surface, whereby the module member is located in position without being directly secured to the surface, the module member providing a housing for a selectable type of connector member.

2. An electrical connection housing according to claim 1, provided with a plurality of module members containing different connector types.

3. An electrical connection housing according to claim 1, in which the fixed member has two opposed outer side faces of similar shape both of which are adapted to receive module members.

4. An electrical connection housing according to claim 1, in which the fixed member provides a housing for a mains distribution outlet socket.

5. An electrical connection housing according to claim 1, wherein said protruding engagement means comprises at least one T-shaped extension.

6. An electrical connection housing according to claim 5, including at least one recess in said fixed member receiving said T-shaped extension.

7. An electrical connection housing according to claim 6, wherein said fixed member includes a shroud, said shroud having at least one recess for receiving said T-shaped extension.

8. An electrical connection housing according to claim 7, wherein said protruding engagement means comprises two T-shaped extensions and said shroud has two recesses for receiving said extensions.

9. An electrical connection housing according to claim 8, wherein said shroud has a central opening and wherein a socket is located in said opening.

10. An electrical connection housing according to claim 9, wherein said module member is a power spur module which comprises a housing block and a contact assembly, said contact assembly having a plate, and said housing block having a first slot for receiving a portion of flat cable and a second slot for receiving said plate.

11. An electrical connection housing according to claim 10, including a bolt threade through said plated and an insulation displacement contact on the end of said bolt.

12. An electrical connection housing according to claim 11, wherein said insulation displacement contact has a cup shape and has insulation displacement portions on its rim.

13. An electrical connection housing according to claim 1, in which the module member has an outer side face of the same shape as the said outer side face of the fixed member whereby a further module member can be attached thereto.

14. An electrical connection housing according to claim 13, wherein said module is a telephone outlet module.

15. An electrical connection housing according to claim 13, wherein said module is a data outlet module.

16. An electrical connection housing according to claim 13, wherein said module is a power spur module.

17. An insulation displacement contact assembly comprising a threaded bolt having a head with rotatable formations thereon, a cup-shaped insulation displacement contact on the end of the bolt and having insulation displacement portions on its rim pointing away from the head, and means retaining the contact on the bolt.

18. An electrical connection device for connection to a flat conductor strip, the device comprising a housing block and a contact assembly, the contact assembly including a plate, a bolt threaded through the plate, and a cup-shaped insulation displacement contact on the end of the bolt and having insulation displacement portions on its rim, and the housing block having a first slot for receiving a portion of said flat conductor strip, and a second slot spaced from and parallel to the first for receiving the plate of the contact assembly.

* * * * *

UNITED STATES PATENT AND TRADEMARK OFFICE
CERTIFICATE OF CORRECTION

PATENT NO. : 4,699,442

DATED : October 13, 1987

INVENTOR(S) : Arthur J. RICHES

It is certified that error appears in the above-identified patent and that said Letters Patent is hereby corrected as shown below:

Column 9:

Claim 11, line 2, change "threade" to read --threaded--; and change "plated" to read --plate--.

Signed and Sealed this

Sixth Day of December, 1988

*Attest:*

DONALD J. QUIGG

*Attesting Officer*  *Commissioner of Patents and Trademarks*